No. 655,704. Patented Aug. 14, 1900.
R. A. GAGE.
NUT LOCK.
(Application filed Nov. 27, 1899.)
(No Model.)

WITNESSES.
Charles T. Hannigan.
Samuel S. Stone

INVENTOR.
Richard A. Gage
by Warren R. Perce
Atty.

UNITED STATES PATENT OFFICE.

RICHARD A. GAGE, OF PAWTUCKET, RHODE ISLAND.

NUT-LOCK.

SPECIFICATION forming part of Letters Patent No. 655,704, dated August 14, 1900.

Application filed November 27, 1899. Serial No. 738,439. (No model.)

*To all whom it may concern:*

Be it known that I, RICHARD A. GAGE, a citizen of the United States, residing at Pawtucket, in the county of Providence and State of Rhode Island, have invented certain new and useful Improvements in Bolts and Nuts, of which the following is a specification, reference being had therein to the accompanying drawings.

Like letters indicate like parts.

Figure 1:
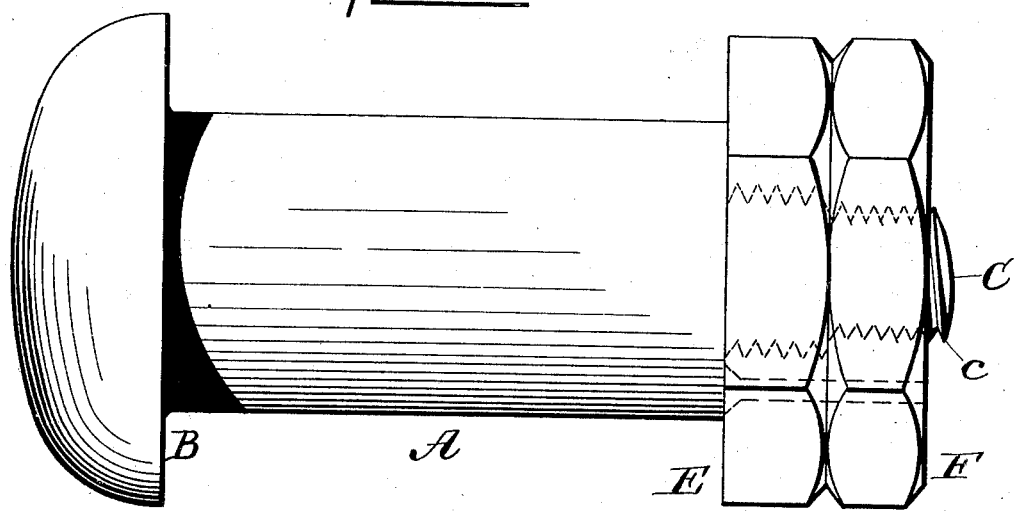
Figure 2:
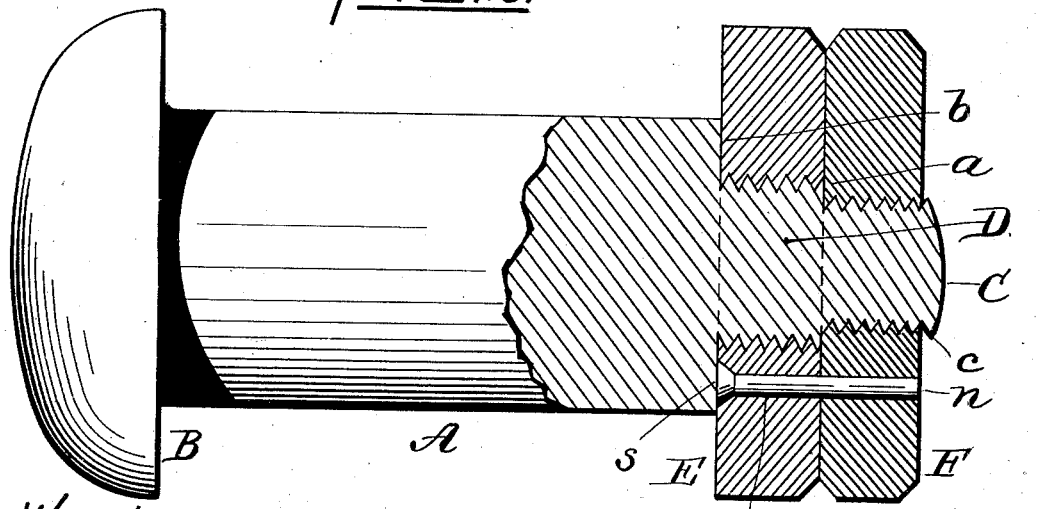

Figure 1 is a side elevation of my invention. Fig. 2 is a view of the same, partly in elevation, showing the head and a portion of the shank of the bolt, and partly in central longitudinal section, showing the end of the bolt, the nuts, and the locking-pin.

My invention relates to bolts and nuts and means for locking the same together; and it consists of the novel construction and combination of the several elements hereinafter particularly described, and as specifically set forth in the claim.

In the drawings, A represents the shank of the bolt, having the usual head B. The end C of the bolt is of a diameter less than that of the shank of the bolt and is made with a right-handed screw-thread $c$. The portion of the bolt next contiguous (designated as D) is of a greater diameter than the portion C, but of a less diameter than the shank A of the bolt, and is made with a left-handed screw-thread $d$. Between the two threaded portions C D of the bolt is the circumferential shoulder $a$, and between the threaded portion D of the bolt and the shank A is the circumferential shoulder $b$, as seen in Fig. 2.

E is a nut having a left-handed screw-thread by which it is engageable with the portion D of the bolt, and F is a nut having a right-handed screw-thread by which it is engageable with the portion C of the bolt. The nuts E and F have the holes $m$ $n$ through them, respectively, of the same diameter and registering with each other to form a continuous bore, and on the face of the nut E which is next to the shoulder $b$ of the shank A of the bolt said hole $m$ is reamed out or countersunk, all as fully shown in Fig. 2. The nut E should be of a thickness equal to the length of the threaded portion D of the bolt, and the nut F should be of a thickness equal to the length of the threaded portion C of the bolt, as shown in Fig. 2.

In the use of my improved bolt and locking-nuts above described the nut E is first secured upon the threaded portion D of the bolt and brings up against the circumferential shoulder $b$ of the shank A. Then the nut F is secured on the end C of the bolt and brings up against the circumferential shoulder $a$. The holes $n$ $m$ of the nuts F E, respectively, are brought into alinement, and a metallic pin, which is of a diameter to tightly fit in said holes $m$ $n$, is driven in said holes. When the entering end of said pin has been driven through the hole $m$ of the nut E, it strikes against the circumferential shoulder $b$ of the shank A of the bolt, and is thereby upset or turned over, and as the driving continues the force of the blows forms said entering end of the pin into a head or knob which fills the countersink $s$ of the hole $m$ of the nut E, thus constituting it an inside riveted head, while the outer end of said pin may also be riveted or headed, if desired. The pin thus forms a lock and prevents the nuts from rotating. As these nuts are threaded in opposite directions and engage with correspondingly-directed threads upon the bolt, they act against each other and cannot be accidentally removed or work loose, while also the locking-pin, which cannot be withdrawn from its place, prevents the nuts from unscrewing or rotating in either direction.

I claim as a novel and useful invention and desire to secure by Letters Patent—

A bolt having a portion of its shank reduced in diameter and screw-threaded for a certain distance in one direction, thus forming a threaded portion with a circumferential shoulder between it and said shank, and also having the end portion still further reduced in diameter and screw-threaded in the opposite direction, thus forming a circumferential shoulder between said two threaded portions, in combination with two nuts, one engageable with the first-mentioned threaded portion of the bolt and the other engageable with the oppositely-threaded end of the bolt, one of said nuts having a hole through it and the other having a corresponding hole through it with a countersink at the end thereof, which is in contiguity with the circumferential shoulder first named, and a pin driven through both said holes and having a riveted head in said countersink, substantially as shown and for the purpose specified.

In testimony whereof I affix my signature in presence of two witnesses.

RICHARD A. GAGE.

Witnesses:
THOMAS E. CARPENTER,
WARREN R. PERCE.